United States Patent [19]

Holmes

[11] 4,170,747
[45] Oct. 9, 1979

[54] FIXED FREQUENCY, VARIABLE DUTY CYCLE, SQUARE WAVE DIMMER FOR HIGH INTENSITY GASEOUS DISCHARGE LAMP

[75] Inventor: Kenneth P. Holmes, Austin, Tex.

[73] Assignee: Esquire, Inc., New York, N.Y.

[21] Appl. No.: 944,730

[22] Filed: Sep. 22, 1978

[51] Int. Cl.² ........................ H05B 41/38; G05F 1/08
[52] U.S. Cl. ...................................... 315/307; 315/205; 315/208; 315/224; 315/287; 315/DIG. 7
[58] Field of Search .................... 315/205, 208, 209 R, 315/224, 225, 246, 287, 291, 307, 308, DIG. 4, DIG. 5, DIG. 7

[56] References Cited

U.S. PATENT DOCUMENTS

| | | | |
|---|---|---|---|
| 3,648,106 | 3/1972 | Engel et al. | 315/307 X |
| 3,707,648 | 12/1972 | Rosa | 315/DIG. 5 |
| 3,816,794 | 6/1974 | Snyder | 315/194 |
| 3,894,265 | 7/1975 | Holmes et al. | 315/DIG. 4 |
| 3,969,652 | 7/1976 | Herzog | 315/DIG. 7 |
| 3,999,100 | 12/1976 | Dendy et al. | 315/205 X |
| 4,041,367 | 8/1977 | Gold et al. | 363/97 |
| 4,053,813 | 10/1977 | Kornrumpf et al. | 315/209 R X |

FOREIGN PATENT DOCUMENTS 1229256 4/1971 United Kingdom.

Primary Examiner—Eugene R. LaRoche
Attorney, Agent, or Firm—Frank S. Vaden, III

[57] ABSTRACT

A dimmer circuit for an HID lamp is provided for supplying a square wave current therethrough at a constant frequency, but whose duty cycle is variable dependent on a sensed current level. The circuit employs a first pair of transistor switches for reversing polarity through the lamp at a low frequency rate. Associated with each of those transistors is a circuit having a transistor switch connected to a drive circuit employing a timer network. The timer network produces an output that is a square wave, the leading edge of which occurs at regular intervals at a high frequency rate. The trailing edge occurs dependent on a dim/bright voltage setting and upon the amount of current through a sensing resistor in series with the lamp.

9 Claims, 7 Drawing Figures

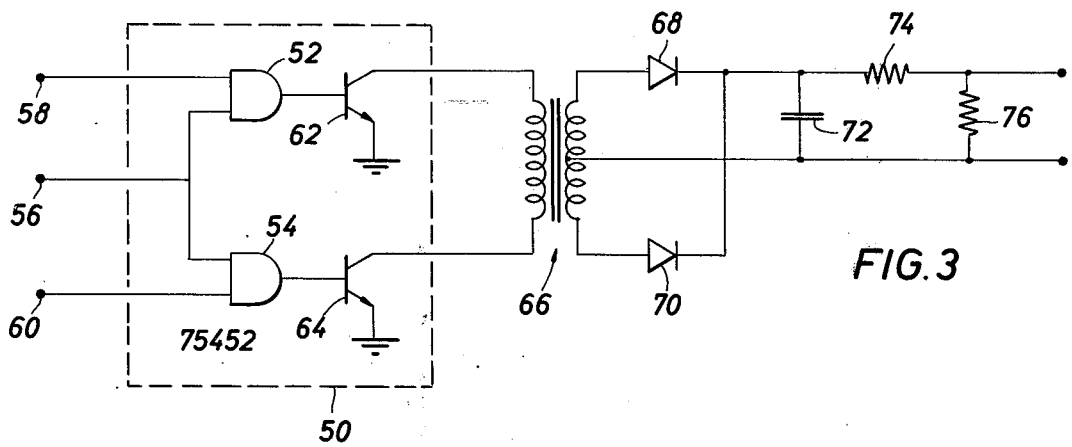
FIG.3
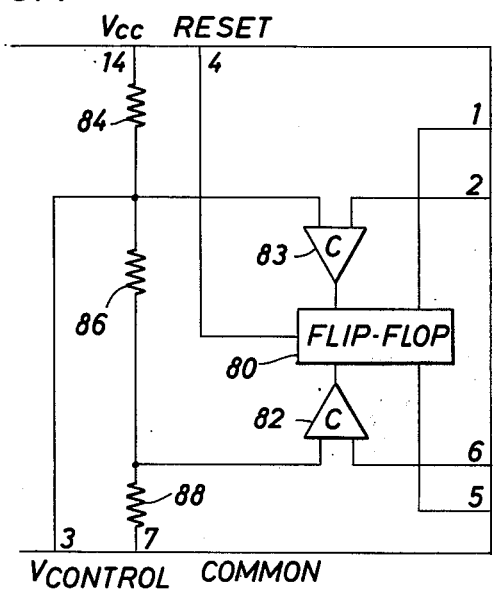
FIG.4
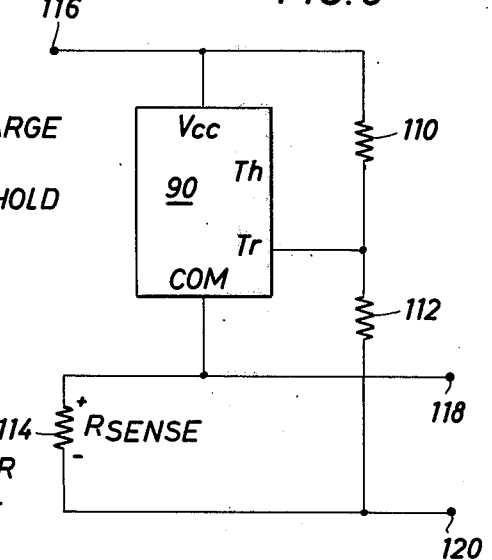
FIG.6
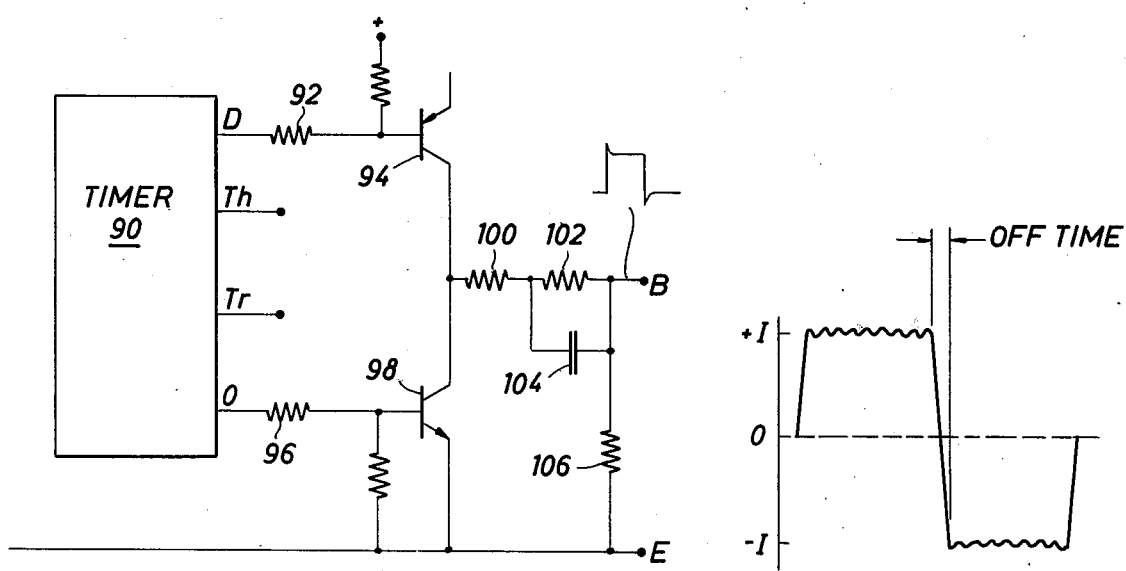
FIG.5
FIG.7

FIXED FREQUENCY, VARIABLE DUTY CYCLE, SQUARE WAVE DIMMER FOR HIGH INTENSITY GASEOUS DISCHARGE LAMP

BACKGROUND OF THE INVENTION

1. Field of the Invention

This invention relates to lamp dimmer circuits for high intensity, gaseous discharge (HID) lamps, and more particularly to a dimmer circuit that supplies a square wave current to the lamp at a constant frequency, the duty cycle of which is both externally controllable to provide a change in lamp intensity and internally regulated in accordance with the amount that the current flowing through the lamp varies from a settable norm.

2. Description of the Prior Art

U.S. Pat. No. 3,816,794, Snyder, describes a circuit employing a two-part reactive ballast connected in series with a high intensity, gaseous discharge lamp. One of the two elements of the ballast is connected across the main terminals of a triac operating as a gated bypass means. When the triac conducts, a current path is established through the triac, at least partially bypassing the reactive element. The duration of conduction determines the total amount of current through the ballast, and hence through the lamp, thereby providing a means for establishing the brightness of the lamp.

In the circuit described in U.S. Pat. No. 3,816,794, low gate source or drive voltage to the gate of the gated bypass triac is derived from a potentiometer, an isolating transformer circuit, a second triac and a Zener diode network, together with other components. The gated bypass triac is fired from a gate source in phase with line voltage, the amplitude being controlled by a gate-signal control device including a Zener diode to properly time the turning on of the triac in relation to lamp current. The Zener diode also prevents the triac from being triggered past a time where there might be opposite polarity ballast-element voltage and lamp current, which would cause flicker of the lamp.

U.S. Pat. No. 3,894,265, Holmes, et al., discloses a circuit that provides a control network for a gated bypass network similar to that shown in the U.S. Pat. No. 3,816,794 patent, the control network including a programmable unijunction transistor. The gating of the bypass triac is by ac gating. Ready connection to single power and three-phase power systems is achieved.

Variations in controlling the timing operations to a gated semiconductor connected for at least partial current bypass operation of a ballast connected to an HID lamp are shown in the following patent applications: Patent application Ser. No. 927,555, "Optocoupler Dimmer Circuit for High Intensity Gaseous Discharge Lamp," filed July 24, 1978, Nuver; patent application Ser. No. 930,913, "High Frequency Dimmer Circuit for High Intensity Gaseous Discharge Lamp Dimmer," filed Aug. 4, 1978, Nuver; patent application Ser. No. 936,883, "Non-Interfering, Overlapping High Frequency Signalling for Lamp Dimming Circuit," filed Aug. 25, 1978, Nuver; and patent application Ser. No. 941,157, "Adjustable DC Pulse Circuit for Variation Over a Predetermined Range Using Two Timer Networks," filed Sept. 11, 1978, Nuver; all commonly assigned to the same assignee as the present application.

Although there are many schemes for gating a semiconductor device for at least partial current bypass of a ballast connected to an HID lamp to which an applied ac source voltage is applied, applicant employs a unique combined switching regulator and transistor bridge arrangement operating at a constant frequency and varying the duty cycle of the current through the lamp at a high frequency rate as controlled by a voltage setting and sensed by a current sensor in series with the lamp to thereby effectively provide a dim/bright current through the lamp.

It is therefore a feature of the present invention to provide an improved dimmer operating to provide a constant frequency, variable duty cycle operation to an HID lamp.

It is another feature of the present invention to provide an improved dimmer operating to provide a constant frequency, variable duty cycle operation to an HID lamp at a high frequency rate while reversing the current therethrough at a low frequency rate.

It is still another feature of the present invention to provide an improved dimmer having all of the desirable features set forth above.

SUMMARY OF THE INVENTION

The embodiment of the present invention employs an inductor in series with the HID lamp to be controllably dimmed. Dc current therethrough is reversed in polarity by a pair of transistor switches operating at a low frequency (e.g., 60 Hz), thereby effectively supplying a square wave current. Another pair of transistors is operated to interrupt the passage of current through the lamp and inductor at a high frequency rate. One of these transistors performs this switching associated with each of the first pair.

Each of the second pair of transistors is connected to a drive circuit including a timer. Switching on is at regular intervals. Switching off of the timer and hence the transistor is variable. A voltage divider including a sensing resistor in series with the lamp regardless of which of the second pair of transistors is operating, determines the trigger voltage for the trailing edge of the output from the timer. An applied control voltage determines the level at the top of the divider. One of the elements in the divider is the sensing resistor. Increasing current in the inductor is sensed by the resistor and causes the timer to trigger when the current reaches a predetermined level. The predetermined level can be reduced or increased by a corresponding setting of the control voltage. Hence, the frequency of high frequency switching remains constant, but the duty cycle is varied.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings:

FIG. 3 is a simplified schematic diagram of a preferred drive circuit connected to each transistor 16 and 18, as shown in FIG. 1.

FIG. 4 is a simplified schematic diagram of the timer network employed in the drive circuit illustrated in FIGS. 5 and 6.

FIG. 5 is a simplified schematic diagram of a preferred drive circuit connected to each transistor 28 and 30, as shown in FIG. 1.

FIG. 6 is a simplified schematic diagram of the variable control connections to the drive circuit of FIG. 5 to effect dim/bright operation.

FIG. 7 is a waveform diagram of the current through the lamp in accordance with the present invention.

DESCRIPTION OF THE PREFERRED EMBODIMENT

The amount of current applied through a high intensity, gaseous discharge lamp causes a change of light intensity thereof, all other factors remaining approximately equal. In other words and by way of example, a one ampere current applied to a 400-watt mercury vapor lamp produces what may be characterized as a relatively dim illumination and a three ampere current applied to the same lamp produces what may be characterized as a relatively bright illumination. By supplying a current between these extremes, it is possible to provide a gradation of brightness. Other HID lamps such as metal halide lamps and self-start high pressure sodium lamps respond in the same manner.

The circuit described more fully hereinafter uses an inductor in series with the lamp. Assume that the lamp has reached steady state operation. A source voltage is impressed across the combination, causing current to flow through the combination. Assume further that operating current is in its mid-range (lamp medium bright) and rising. At that moment, the source voltage is removed. The inductor maintains flow of current, but then it starts to fall. Then the source voltage is reapplied to cause the current to rise again.

The turning on and turning off switching of the source voltage is readily accomplished at a constant rate at a relatively high frequency, such as 20 KHz. In order to select a brighter illumination operating mode, keeping the frequency the same, it is possible to apply the source voltage longer each cycle of switching, thereby reducing the removal time of the source voltage each cycle. After the operation reaches a high ampere level, then the ratio of on-to-off will again stabilize. In like fashion, it is possible to reduce the ampere level to a dim operating mode.

Although ratio of on-to-off is mentioned above, the term, and definition therefor, commonly employed instead, is "duty cycle," which is the ratio of on time to total cycle time. Operation in the manner described is therefore, constant frequency, variable duty cycle operation.

Because the application of a dc voltage is harmful to an HID lamp causing excessive electrode wear, decreased efficiency and color separation in some types of lamps, it is possible to reverse the polarity of source voltage to the combination at a relatively low frequency rate, e.g., 60 Hz, and to apply the high frequency switching operation for dim/bright control described thereto, as well. Since the polarity reversing is readily accomplished using complementary transistor switches and the dim-bright control operation is readily accomplished using a separate high frequency transistor switch for each polarity of operation, the overall switching network, or switching portion of the circuit, conveniently employs four transistor switches in the manner hereafter described.

Figure 1:
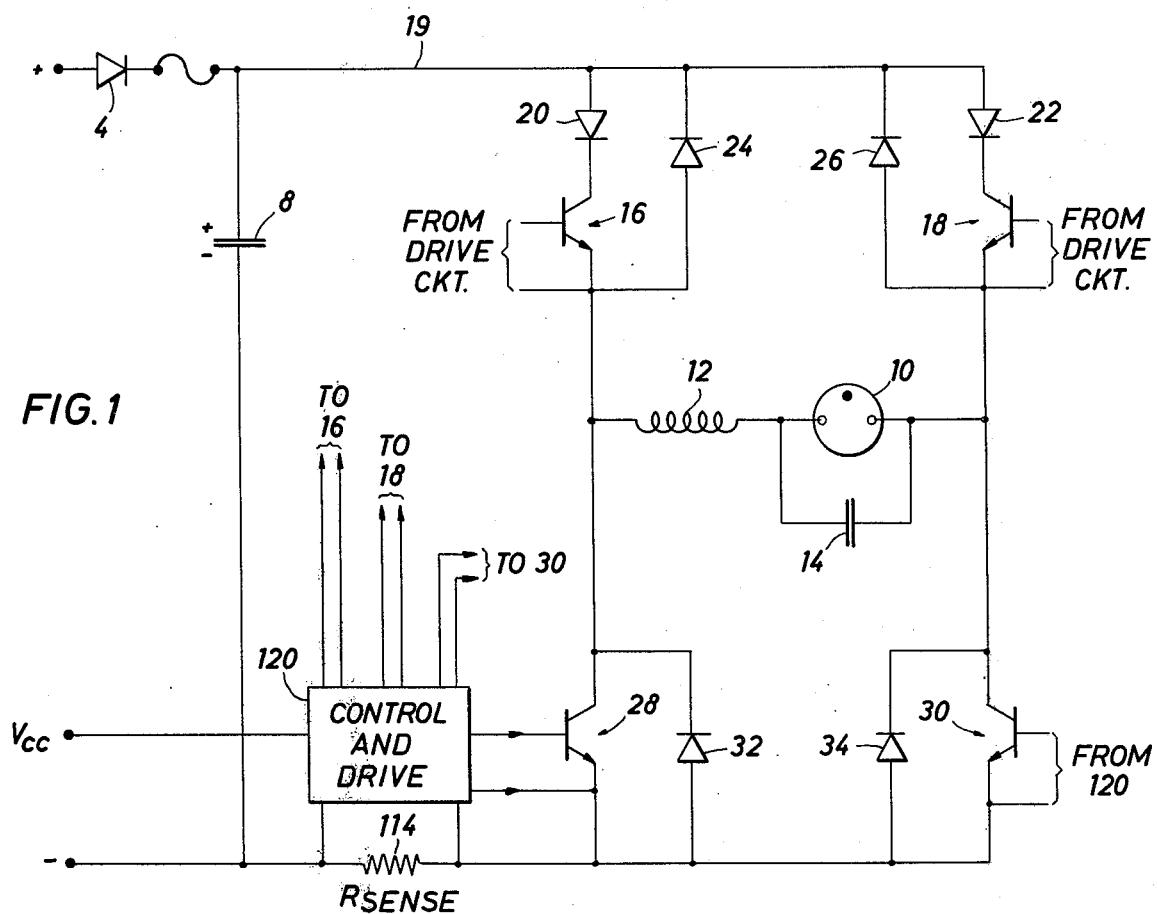
FIG. 1 is a simplified schematic diagram and block diagram of a preferred embodiment of the present invention.

Now referring to the drawings and first to FIG. 1, a simplified schematic diagram of the switching portion of the preferred embodiment of the present invention is shown. Dc source voltage is applied via diode 4 and fuse 6 across filter capacitor 8 to the circuit via "++" terminal and "—" terminal. High intensity, gaseous discharge (HID) lamp 10 is connected in series with inductor 12. Capacitor 14 is connected across lamp 10.

A dual switching network is connected to the series lamp-and-inductor combination. The emitter of npn transistor 16 is connected to one end of this series combination and the emitter of npn transistor 18 is connected to the other end of this series combination. The collector of transistor 16 is connected to high voltage line 19 via diode 20 and the collector of transistor 18 is connected to the incoming high voltage line via diode 22. The anodes of these two diodes are connected to the high voltage line.

Diode 24 is connected from the emitter of transistor 16 to the high voltage line, the cathode of the diode being connected to the high voltage line. Diode 26 is connected from the emitter of transistor 18 to the high voltage line, the cathode of the diode being connected to the high voltage line. Operationally, as will be described hereinafter, the network of transistor 16 including its associated diodes is substantially identical to the operation of transistor 18 including its associated diodes within their respective operating periods.

The collector of npn transistor 28 is connected to the same end of the lamp-and-inductor combination as is transistor 16 and the collector of npn transistor 30 is connected to the opposite end of this lamp-and-inductor combination, or to the same end as is connected to transistor 18. The emitters of transistors 28 and 30 are connected to the common line of the network. Diode 32 is connected across the collector-emitter junction of transistor 28 with the anode connected to the common line and diode 34 is connected across the collector-emitter junction of transistor 30, with its anode connected to the common line. Operationally, transistors 28 and 30, with their respective associated diode, are identical within their respective operating periods in the manner hereinafter described.

In simplified operation, a low frequency voltage is applied to the base of transistor 16 and to the base of transistor 18 so as to cause alternate conduction of these two transistors. That is, first transistor 16 is driven to hard conduction in switch-like fashion and then it is shut off and transistor 18 is driven to hard conduction in switch-like fashion to apply the line voltage to the lamp-and-inductor combination. The line voltage is typically a nominal 360 volts dc. Then, the sequence repeats itself such that when transistor 16 is rendered conductive, transistor 18 is rendered non-conductive and when transistor 18 is rendered conductive, transistor 16 is rendered non-conductive. A typical switching rate for transistors 16 and 18 is 60 Hz, although any frequency which is sufficiently fast so as to avoid the appearance of flicker of the lamp is suitable.

While transistor 16 is rendered conductive, there is no voltage applied to the base of transistor 28, so it is rendered non-conductive. However, a relatively high frequency voltage is applied to the base of transistor 30 to render it alternatively conductive and non-conductive. The voltage applied to the base of transistor 30 is at a nominal high frequency of 20 KHz. In similar fashion, while transistor 18 is rendered conductive, there is no voltage applied to the base of transistor 30, so it is rendered non-conductive. But, the relatively high frequency voltage previously applied to the base of transistor 30 is now applied to the base of transistor 28.

Inductor 12 is a storage element. When both transistors 16 and 30 are conducting (transistors 18 and 28 not conducting), and assuming 360 volts applied across inductor 12 and lamp 10, there is approximately a 130-volt drop across the lamp and a 230-volt drop across inductor 12. Current through the lamp is increasing from some nominal value. When transistor 30 is not conducting, the 130-volt lamp voltage now appears across the inductor. Current through the lamp is now decreasing from the nominal value. Diode 26 conducts to provide the current return path through the lamp.

Likewise, when both transistors 18 and 28 are conducting (transistors 16 and 30 not conducting), increasing current from a nominal level passes through the lamp and transistor 28. When transistor 28 no longer conducts, then lamp current decreases from a nominal level, the return path therefore being conducting diode 24.

Figure 2:
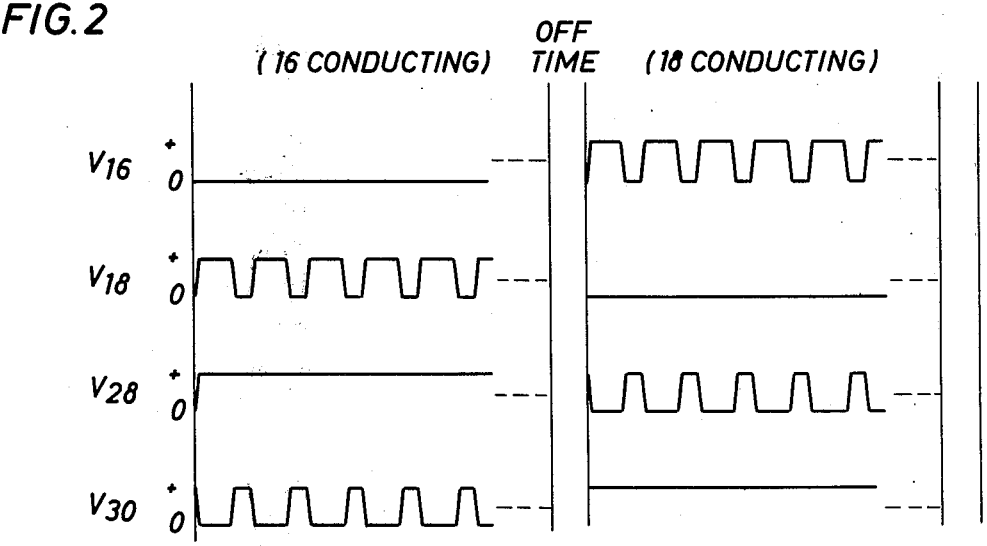
FIG. 2 is a waveform diagram ilustrating the switching operation of the four transistor switches shown in FIG. 1.

Except for the variableness of the duty cycle with a movement of a dim or bright control, FIG. 2 shows the combined switching operation just described. For ease of illustration, the cycle length of the high frequency operation is shown in exaggeration.

Now referring to FIG. 3, a drive network is shown for connection to each transistor 16 and 18. The area within the dotted lines is a standard Model 75452 integrated circuit 50 made by many manufacturers and referred to as TTL AND GATES. ("TTL" stands for transistors and transistor logic.) In any event, two AND gates 52 and 54, having a common inhibit input junction 56, are connected to receive alternating timing signals at junctions 58 and 60. Typically, this input is from a logic circuit having opposite logic outputs for the alternating drive circuit. Grounded emitter transistors 62 and 64 are connected respectively to AND gates 52 and 54 to drive transformer 66 in push-pull fashion. Diodes 68 and 70, connected to the respective ends of the secondary of transformer 66, rectify the output. Capacitor 72, connected between the diode output and the center tap of the transformer secondary, series resistor 74 and resistor 76 across the output terinals of the network, provide filtering so that the output applied to the base-emitter junctions of either transistor 16 or 18 is driven hard on during the turn-on switching mode for the transistor.

Note from FIG. 2 that there is a total off time when both transistors 16 and 18 are non-conducting, which prevents any inadvertent erratic operation to the lamp that could cause flicker or irregular variation of light intensity.

Now referring to FIG. 5, a drive circuit is shown for operating each transistor 28 and transistor 30. Each circuit uses a timer circuit having characteristics of operation described below. Since there are two timers of substantially identical design used in each of the two drive circuits, it is convenient to use a standard Model 556 timer produced by many manufacturers, which timer includes two identical timers for use as hereinafter described. One-half of the dual timer circuit is operably connected to each transistor 28 and 30 in the manner hereafter described. Alternatively, two standard Model 555 timers, also produced by many manufacturers, can be used. Or, finally, timers comprising discrete components and functioning in the manner of these timers can be employed.

FIG. 4 shows the simplified internal pin connections to a first half of a Model 556 timer.

In operation, a trigger input is applied to pin 6 when the voltage thereto drops below a predetermined level. Normally this level is one-third of the $V_{cc}$ value applied to pin 14. When this occurs, internal comparator 82, sampling the trigger input and an internal voltage level of one-third $V_{cc}$ via a voltage divider causes internal flip-flop 80 to change state so that a high level voltage is applied to pin 5. Hence, output pin 5 of the timer produces a positive-going leading edge of a square wave with the occurrence of a trigger at pin 6.

When there is no control voltage applied to pin 3, then the voltage divider comprising internal resistors 84, 86 and 88 establish one input to another comparator 83 at two-thirds the $V_{cc}$ voltage applied at pin 14. The threshold input at pin 2 is the other input to comparator 83. Therefore, when the threshold voltage level exceeds two-thirds $V_{cc}$, the flip-flop again changes states to produce a negative-going output to pin 5, producing the negative-going trailing edge of the output. The change of state of flip-flop 80 also places a zero level output on pin 1. Hence, the voltage on discharge pin 1 follows the voltage level on output pin 5. That is, the voltage levels on both pins 1 and 5 go up and down together.

Now referring to FIG. 5 again, the discharge pin of timer 90 is applied through base resistor 92 to pnp transistor 94. The output pin of timer 90 is applied through base resistor 96 to npn transistor 98. The collectors of transistors 94 and 98 are connected together and to resistor 100. Resistor 100 is connected in series with the parallel connection in resistor 102 and capacitor 104. Resistor 106 is connected between the "B" and "E" output terminals.

In operation of the drive circuit shown, a low voltage output applied to the bases of transistors 94 and 98 turns transistor 94 on and turns transistor 98 off. Similarly, a high voltage output applied to the bases of transistors 94 and 98 turns transistor 94 off and turns transistor 98 on. The current output level on terminal "B" is shaped by the resistor-capacitor components to produce a high peak leading edge for fast switching operation of the transistor connected thereto and a steady-state medium current level for good saturation drive action.

Basically, it can now be observed that the application of a signal at regular intervals to the threshold pin, e.g., a pulse every 50 microseconds (20KHz rate) having a duration of 1 microsecond, produces the leading edge also at regular intervals. The trailing edge is determined by the timing occurrence of the application of the trigger input to timer 90. Changing the timing occurrence of the conclusion event, as described above, does not change the frequency of the output, but does provide the means for varying the duty cycle.

FIG. 6 illustrates the connections to timer 90 for varying the duty cycle of the circuit as is desirable for changing the intensity level of the HID lamp.

A voltage divider comprising resistors 110 and 112 and $R_{SENSE}$ resistor 114 is connected between the $V_{cc}$ pin and the common pin of timer 90. Assuming that the current through $R_{SENSE}$ resistor is not affected by outside influence (which it really is, as will be explained hereafter), then varying the applied $V_{cc}$ voltage level connected to terminal 116 (to the $V_{cc}$ pin of the timer) will proportionally vary the trigger input level to the timer. A lowering of the $V_{cc}$ reduces the required trigger voltage level of the trigger input.

When the current is applied to terminals 118 and 120 across $R_{SENSE}$ resistor 114 so that it flows from "+" to "−," as shown, it pulls the voltage of terminal 120 negative with respect to timer common 118. Hence, as the external current applied through $R_{SENSE}$ goes up, the positive voltage between the trigger input and common decreases toward the value of one-third $V_{cc}$. A reduction of trigger voltage advances the trailing edge of the square wave output and thereby reduces the duty cycle of the drive circuit to output terminal "B" (FIG. 5). Hence, it may be seen that either a reduction in $V_{cc}$ or an increase in current amplitude through $R_{SENSE}$ shortens the duty cycle operation. Or, for a fixed level $V_{cc}$, sensing a current $I_{MAX}$ of predetermined amplitude results in a turning off signal at terminal "B."

Transistor 28 is connected to the "B" (base) and "E" (emitter) terminals of a drive circuit as shown in FIGS. 5 and 6 and the base is connected to a complementary drive input to that applied to transistor 16. In like fashion, transistor 30 is connected to the "B" and "E" terminals of another drive circuit as shown in FIGS. 5 and 6 and the base is connected to a complementary drive input to that applied to transistor 18.

In overall operation, transistor 16 is turned on and transistors 18 and 28 are turned off. Transistor 30 is constant high frequency (e.g., 20 Khz), with a variable duty cycle. When transistors 30 is turned off, current flow is forced through diode 26. When transistor 30 is turned on, current flows through transistors 30 and through $R_{SENSE}$ resistor 114 in series with the emitter. The sensing of current by $R_{SENSE}$ determines when the turn off current is applied from control and drive network 120 (which includes duplicate circuits such as described in FIGS. 5 and 6) to the base of transistor 30. Additional drive networks in networks 120 are applied to the bases of transistors 16 and 18 at the regular low frequency rate as previously described. A setting of a lower control voltage reduces the trigger level needed to be sensed and therefore operates to the lamp at an effective lower or a "dim" current level.

During the alternate operation of transistors 16 and 18, transistor 18 is turned on and transistors 16 and 30 are turned off. Transistor 28 is then switched on and off at the constant high frequency with a variable duty cycle. When transistor 28 is turned off, current flow is forced through diode 24. When transistor 28 is turned on, current flows through transistor 28 and through $R_{SENSE}$ resistor 114 in series with its emitter. Again, the sensing of current by $R_{SENSE}$ determines when the turn off current is applied from control and drive network 120 to the base of the transistor 28. Also again, a setting of a lower control voltage ($V_{cc}$) reduces the trigger level needed to be sensed and therefore operates the lamp at an effective dimmer level than before such reduction. In inverse fashion, a higher $V_{cc}$ voltage setting operates the lamp at an effective brighter level.

FIG. 7 illustrates the shape of the current flowing through lamp 10. When current is flowing through transistors 16 and 30, and with a 360-volt dc source voltage applied, there is approximately 130 volts across the lamp and 230 volts across inductor 12. Hence, current through the lamp is increasing through the lamp in accordance with the following formula: V (230 volts)=Ldi/dt. When transistor 30 is not conducting, then approximately 130 volts appears across the inductor and current through the lamp is decreasing in accordance with the following formula: V (130 volts)=-Ldi/dt. Operation of transistors 18 and 28 is with respect to the opposite polarity. Hence, ripple in both polarities of the output occurs, as shown.

The reason that diodes 20 and 22 are included respectively in the collectors of transistors 16 and 18 are to prevent false turn on of these transistors. That is, when diode 26 conducts, transistor 18 would turn on with emitter-to-collector current flow except for the presence of diode 22. Likewise, when diode 24 conducts, transistor 16 would turn on except for the presence of diode 20.

The circuit just described can be operated either in conjunction with a manual dim control, such as provided by a rheostat, or by an automated connection. For example, it might be desirable to dim the lamp during a particular time of day. Therefore, a clock providing a "bright" $V_{cc}$ voltage at some hours of the day and a "dim" $V_{cc}$ voltage at other hours of the day could be connected to control and drive circuit 120.

It should also be apparent that logic signals are readily transmitted to a plurality of lamp circuits, each equipped with the circuit described herein. Hence, long line transmission of variable power is not required. Also, since the frequency of operation remains constant, no complex frequency generators are required. If at a location, however, variable frequency is available as a control signal, a relatively simple frequency-to-voltage device can be connected to provide linear dc voltage regulation in the manner just described. Furthermore, it is common to have batteries operate as an emergency power source. When conventional power goes out, dim control, either manual or automatic, is readily accomplished with the circuit described hereinabove. A dim operation might be desirable, in many cases, to minimize drain on the batteries.

Please also not that to provide perfectly balanced operation, inductor 12 could be split into two inductors, one on each side of lamp 10.

Finally, it can be appreciated that the square wave current (FIG. 7) is the ideal drive current to an HID lamp. With fast switching of one polarity to the other, there is relatively little deionization. Since there are no peaks or spikes applied to the lamp, there is little chance of reignition problems and the crest factor ($I_{peak}/I_{rms}$) is almost unity. So, not only is the circuit more efficient that with a sine wave voltage source, the operation in the manner described is less harmful to the lamp.

While a particular embodiment of the inventon has been shown and described, it will be understood that the invention is not limited thereto, since modification may be made and will become apparent to those skilled in the art.

What is claimed is:

1. A dimmer circuit connectable to a dc voltage source for applying a constant frequency, variable duty voltage to a high intensity discharge lamp, a change in the ratio of applying voltage from the dc source compared to the overall period of applying such voltage and a greatly reduced voltage providing a range of dimming currents to the lamp, comprising an inductor in series with the lamp,
    a dual switching circuit connected to the lamp and inductor including a pair of transistor networks alternatively and complementarily conducting, thereby directing current from the dc voltage source in opposite directions through the lamp at a low frequency, a first electronic on-off switch connected alternatively to provide and to deny the voltage from the source to the lamp during the time the first of said pair of transistor networks is conducting, at a high frequency rate, a second electronic on-off switch connected alternatively to provide and to deny the voltage from the source to the lamp during the time the second of said pair of transistor networks is conducting, at the same high frequency rate, first and second timer means connected respectively to said first and second switches, each said first and second timer means being connected to a constant-frequency, cycle-initiating signal at a high frequency, current sensing means connected for receiving a current which passes through one of said first and second switches and through the lamp when one of said first and second switches is on, and voltage triggering means connected to said current sensing means and to a preset voltage level for producing a cycle terminating signal to each said first and second timer means, a predetermined preset voltage level producing a terminating signal dependent on the time the resulting current flow through the lamp reaches a predetermined level, said inductor maintaining reduced current flow at the greatly reduced voltage through the lamp following the occurrence of the terminating signal and before the occurrence of the succeeding cycle-initiating signal.

2. A dimmer in accordance with claim 1, wherein said voltage triggering means includes means for varying the present voltage, a lowering of said voltage reducing the predetermined level at which current flow through the lamp needs to reach to produce the terminating signal.

3. A dimmer circuit in accordance with claim 1, and including a constant low frequency, constant duty cycle switching source connected to said pair of transistor networks.

4. A dimmer circuit in accordance with claim 3, wherein said low frequency switching source includes a push-pull drive network connected to each of said pair of transistor networks to cause alternate and complementary conducting thereof.

5. A dimmer circuit in accordance with claim 4, wherein said low frequency switch source includes logic drive means connected to initiate alternate sequencing of said push-pull network.

6. A dimmer circuit in accordance with claim 1, wherein each of said first and second switches includes a switching transistor and wherein each of said first and second timer means produces a fast switching current to said switching transistor, each of said timer means including means for producing a first polarity output resulting from application of said high frequency initiating signal, said first polarity output having a high peak at the start of said first polarity output and a level output thereafter and for producing a second polarity output resulting from application of said terminating signal, said second polarity output having a high peak at the start of said second polarity output and a level output thereafter.

7. A dimmer circuit in accordance with claim 6, wherein said timer means includes a timer producing a first polarity output with the application of said initiating signal, a transistor switch for turning on with the application of said first polarity output, and a resistor-capacitor network for producing a peak current to one of said electronic on-off switches with the switching on of said transistor switch and a constant current of first polarity thereafter.

8. A dimmer circuit in accordance with claim 7, wherein said timer produces a second polarity output with the application of said terminating signal, a second transistor switch for turning on with the application of said second polarity output, said resistor-capacitor network producing a peak current of second polarity to said one of said electronic on-off switches with the switching on of said second transistor switch and a constant current of second polarity thereafter.

9. A dimmer circuit in accordance with claim 1, wherein said voltage triggering means includes a voltage divider connected to said current sensing means, said preset voltage being applied to said voltage divider and current sensing means, one of a high sensing current and a low preset voltage advancing the occurrence of said terminating signal.

* * * * *